United States Patent
Yi et al.

(10) Patent No.: US 8,640,112 B2
(45) Date of Patent: Jan. 28, 2014

(54) VECTORIZING COMBINATIONS OF PROGRAM OPERATIONS

(75) Inventors: Haoran Yi, Austin, TX (US); Brady C. Duggan, Austin, TX (US); Robert E. Dye, Austin, TX (US); Adam L. Bordelon, Austin, TX (US); Jeffrey L. Kodosky, Austin, TX (US)

(73) Assignee: National Instruments Corporation, Austin, TX (US)

( * ) Notice: Subject to any disclaimer, the term of this patent is extended or adjusted under 35 U.S.C. 154(b) by 324 days.

(21) Appl. No.: 13/076,245

(22) Filed: Mar. 30, 2011

(65) Prior Publication Data

US 2012/0254845 A1    Oct. 4, 2012

(51) Int. Cl.
   *G06F 9/44*    (2006.01)
   *G06F 9/45*    (2006.01)

(52) U.S. Cl.
   USPC .......... 717/149; 717/109; 717/140; 717/144; 717/150; 717/159; 717/160

(58) Field of Classification Search
   None
   See application file for complete search history.

(56) References Cited

U.S. PATENT DOCUMENTS

| | | | |
|---|---|---|---|
| 4,710,872 A | 12/1987 | Scarborough | |
| 4,847,755 A | 7/1989 | Morrison et al. | |
| 7,367,026 B2 | 4/2008 | Eichenberger et al. | |
| 7,802,076 B2 | 9/2010 | Almog et al. | |
| 7,856,627 B2 | 12/2010 | Archambault et al. | |
| 7,962,906 B2 * | 6/2011 | O'Brien et al. | 717/160 |
| 2004/0003381 A1 * | 1/2004 | Suzuki et al. | 717/150 |
| 2005/0283775 A1 * | 12/2005 | Eichenberger et al. | 717/151 |
| 2005/0289529 A1 * | 12/2005 | Almog et al. | 717/158 |
| 2008/0034356 A1 * | 2/2008 | Gschwind | 717/149 |
| 2008/0092125 A1 * | 4/2008 | Archambault et al. | 717/140 |
| 2008/0127146 A1 * | 5/2008 | Liao et al. | 717/150 |
| 2008/0229066 A1 | 9/2008 | Gschwind | |
| 2008/0229298 A1 * | 9/2008 | O'Brien et al. | 717/160 |
| 2011/0029962 A1 | 2/2011 | Nuzman et al. | |

\* cited by examiner

*Primary Examiner* — Insun Kang

(74) *Attorney, Agent, or Firm* — Meyertons Hood Kivlin Kowert & Goetzel, P.C.; Jeffrey C. Hood; Mark S. Williams

(57) ABSTRACT

System and method for vectorizing combinations of program operations. Program code is received that includes a combination of individually vectorizable program portions that collectively implement a first computation. Each individually vectorizable program portion has at least one array input and at least one array output. The combination of individually vectorizable program portions is transformed into a single vectorizable program portion that is or includes a functional composition of the combination of individually vectorizable program portions. Vectorized executable code implementing the first computation is generated based on the single vectorizable program portion. The generated executable code is directed to SIMD (Single-Instruction-Multiple-Data) computing units of a target processor.

23 Claims, 12 Drawing Sheets

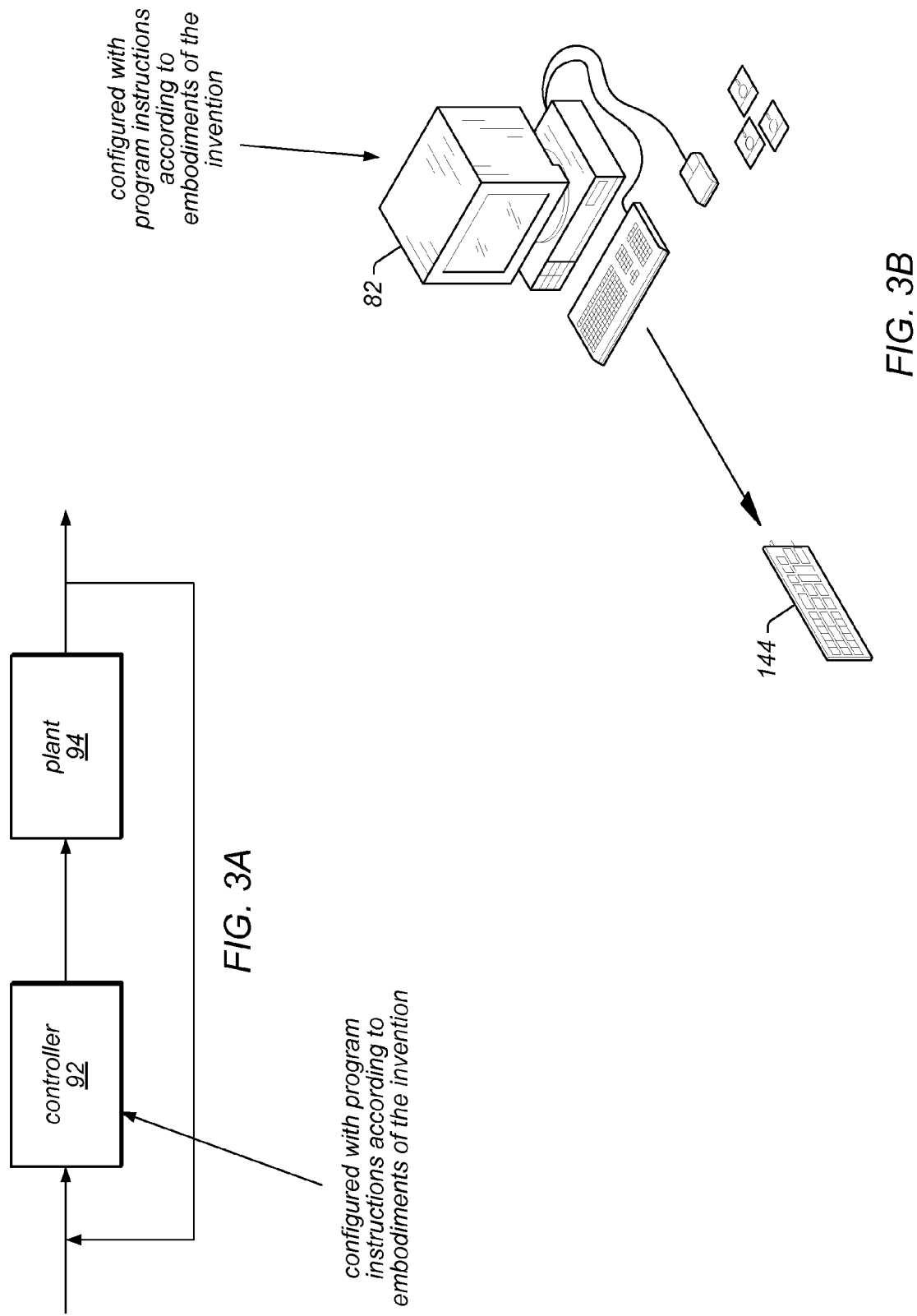

VECTORIZING COMBINATIONS OF PROGRAM OPERATIONS

FIELD OF THE INVENTION

The present invention relates to the field of programming, and more particularly to a system and method for vectorizing combinations of program operations.

DESCRIPTION OF THE RELATED ART

Parallel computation has become increasingly common with the development of supporting hardware and software, including multi-processor systems, multi-core processors, multi-threading, and so forth. Vectorization is an optimization technique in which certain parts of sequential programs are transformed into parallel parts (e.g., by a compiler) without rewriting the program code or logic.

One example of vectorization is implemented in traditional compilers for text-based imperative programming languages such as C. In these approaches, the compiler analyzes an individual loop which is part of a control flow graph to determine whether the loop is vectorizable or not. If the loop is vectorizable, then a transform is performed on the control flow graph to achieve the vectorization.

A further example of vectorization is provided by the LabVIEW graphical programming environment provided by National Instruments Corporation, which supports vectorization of individual computations, e.g., polymorphic primitive computations, where, for each polymorphic primitive, a variety of template vectorized callback functions are implemented using vector instructions on the hardware.

An example of the combination of computations is loop fusion, used by traditional compilers for text-based imperative programming languages such as C. Adjacent loops in the control flow graph are analyzed to determine if the loops can be merged, and if so, then a transform is performed on the control flow graph to fuse those loops, i.e., to combine the loops into one loop.

However, current approaches to vectorization are not capable of vectorizing combinations of program operations.

Concurrent with the rise of parallel computation, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY OF THE INVENTION

Various embodiments of a system and method for vectorizing combinations of program operations are presented below.

Program code comprising a combination of individually vectorizable program portions that collectively implement a first computation may be received. Each individually vectorizable program portion may have at least one array input and at least one array output. The program portions may include any of a variety of program code operations. For example, in one embodiment, at least two of the program portions may be or include polymorphic primitives. In another exemplary embodiment, at least two of the program portions may be or include vectorizable loops. However, it should be noted that other types of program portions may be used, so long as they are individually vectorizable.

Moreover, the program code may be in any of a variety of computer programming languages. For example, the program code may be textual, or graphical. Similarly, the program code may be procedural in nature, or may be or include data flow program code. Thus, in one embodiment, the program code may be graphical data flow program code, such as that used in the LabVIEW graphical programming system provided by National Instruments Corporation. Additionally, the program code may implement (or perform) any of a variety of functionalities, including, for example, an industrial automation function, a process control function, or a test and measurement function, among others.

The combination of individually vectorizable program portions may be transformed into a single vectorizable program portion. The single vectorizable program portion may be or include a functional composition of the combination of individually vectorizable program portions. In other words, the resulting single vectorizable program portion may be a composite function composed of the combination of individually vectorizable program portions.

In some embodiments, transforming the combination of individually vectorizable program portions into a single vectorizable program portion may include analyzing data dependences between operations of the individually vectorizable program portions, generating one or more expressions representing each individually vectorizable program portion, based on the analysis, merging the one or more expressions from each individually vectorizable program portion into a single set of expressions representing the first computation, and creating the single vectorizable program portion implementing the first computation in response to the merging, where the single vectorizable program portion includes the single set of expressions.

The program code may be or include graphical program code in a graphical program, where the graphical program includes a plurality of interconnected nodes that visually indicate functionality of the graphical program code.

The data dependency analysis may be performed in any of a variety of ways. For example, in one embodiment, analyzing data dependences between operations of the individually vectorizable program portions may include traversing a data flow graph corresponding to the program code in reverse data flow order, including traversing elements in the data flow graph that correspond to the combination of program portions. Moreover, in some embodiments, the method may further include generating the data flow graph based on the program code.

The single set of expressions representing the first computation may include one or more recursive expressions, e.g., in an intermediate form. For example, in one embodiment, the data flow graph may be in the form of a data flow intermediate representation (DFIR), and the one or more recursive expressions may also be in this form. Of course, in other embodiments, other intermediate forms may be used as desired. In various embodiments, the one or more recursive expressions may be implemented in different ways. For example, the one or more recursive expressions may be or include one or more expression trees, or one or more directed acyclic graph (DAG) representations for or of the one or more recursive expressions. In alternative embodiments, other types of graphs may be used, as appropriate, e.g., cyclic graphs, etc.

In some embodiments, the combination of program portions may include two or more output arrays. Traversing the data flow graph in reverse data flow order may include traversing the data flow graph in reverse data flow order from each of the two or more output arrays respectively. In other words, since there are two or more output structures (the two or more output arrays), and the data flow graph is traversed in reverse data flow order, each output structure is a starting point for a respective traversal.

Vectorized executable code implementing the first computation may be generated based on the single vectorizable program portion. For example, generating the vectorized executable code may include generating executable code directed to SIMD (Single-Instruction-Multiple-Data) computing units of a target processor. However, it should be noted that in other embodiments, the generated executable code may be directed to other types of computing units that facilitate vectorized computations.

In some embodiments, the single vectorizable program portion may be merged with other single vectorizable program portions, e.g., prior to the code generation. For example, the received program code may be a first part of a program, and the program may further include one or more additional parts, where each additional part includes a respective combination of program portions. Moreover, as with the received program code, each program portion in each respective combination of program portions may have at least one array input and at least one array output.

The method may include performing the receiving and transforming described above for each of the respective combinations of program portions, thereby generating one or more respective additional single vectorizable program portions. The single vectorizable program portion may then be merged with at least one of the one or more additional single vectorizable program portions.

Note however that in some embodiments, the merging may be contingent upon certain conditions. For example, in one embodiment, the single vectorizable program portion may be merged with at the least one of the one or more additional single vectorizable program portions in response to determining that the at least one array input of the single vectorizable program portion and the at least one array input of the at least one additional single vectorizable program portion have equal numbers of elements, and that there is no dependency between the single vectorizable program portion and the at least one array input of the at least one of the one or more additional single vectorizable program portions, and any heterogeneous input structures of the vectorization node and the at least one of the one or more additional single vectorizable program portions have the same type. As used herein, the term "heterogeneous input structures" refer to structures that include elements of more than one data type, e.g., "mixed type" structures, nested structures, e.g., arrays of arrays, structures of arrays, arrays of structures, structures of structures, and so forth.

Note, however, that in other embodiments, other merge criteria or constraints may be used as desired. For example, in one embodiment, fulfilling one or more of the criteria mentioned above may be required. Note further that in some embodiments, one or more of the criteria may be determined at edit time, and/or one or more of the criteria may be determined at runtime.

Accordingly, generating the vectorized executable code may include generating the vectorized executable code based on the merged single vectorizable program portion.

Thus, in some embodiments, multiple combinations of individually vectorizable program portions that collectively implement respective computations may be transformed and merged to create a merged single vectorizable program portion, which may then be used to generate vectorized executable code implementing the respective computations. Moreover, as noted above, the generated vectorized executable code may be directed to SIMD computing units of the target processor.

Additionally, in some embodiments, the method may further include graphically indicating any vectorized program portions in the program code. Thus, the user may be able to easily see which portions of the program have been vectorized. The graphical indication(s) may be presented in any of a variety of ways. For example, as noted above, the program may be a graphical program, such as a LabVIEW™ graphical program, which includes a plurality of interconnected nodes that visually indicate functionality of the graphical program code. In some exemplary embodiments, the vectorized program portions in the program code may be graphically indicated by node color, texture, labels, boundaries, e.g., bounding boxes, etc., as desired. In other words, any type of graphical indications may be used as desired or appropriate.

Thus, summarizing an exemplary embodiment of the above method, vectorizable combinations of program portions may be identified in a program, transformed and/or merged into a single vectorizable computation or program portion, which is used to generate vectorized code targeted for execution on the SIMD units of a processor. Additionally, the vectorized computations, combinations, or program code may be indicated in the program graphically.

BRIEF DESCRIPTION OF THE DRAWINGS

A better understanding of the present invention can be obtained when the following detailed description of the preferred embodiment is considered in conjunction with the following drawings, in which:

FIG. 3A is a high level block diagram of an exemplary system which may execute or utilize graphical programs;

FIG. 3B illustrates an exemplary system which may perform control and/or simulation functions utilizing graphical programs;

Figure 1A:
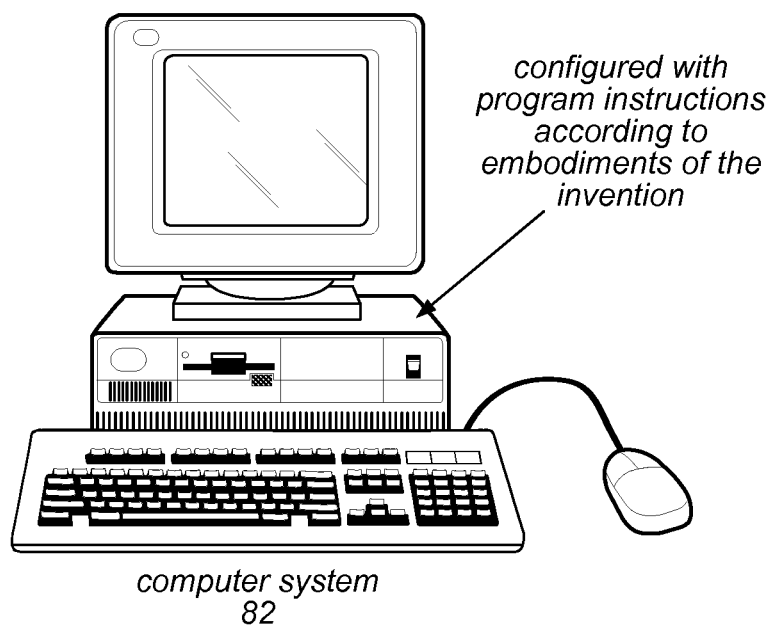
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

U.S. patent application Ser. No. 12/475,916, titled "Loop Parallelization Analyzer for Data Flow Programs", filed Dec. 2, 2010, whose inventors were Haoran Yi, Mary E. Fletcher, Robert E. Dye, and Adam L. Bordelon.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Vectorization—a process of converting a computer program or program code from a scalar implementation which processes each operation on a single pair/tuple of input operands, to a vector implementation which processes each operation on multiple pairs/tuples of input operands at a time, and produces multiple results at a time. The multiple pairs/tuples of the input operands are often organized in vector forms. For example, the vector from may be specified by a vector register in SIMD (Single Instruction Multiple Data) hardware and the numeric type of the operands. For example, on x86 SSE SIMD units, the vector format is 128 bit, which is equivalent to 4 single-precision floats; 2 double-precision floats; 8 16 bit integers, etc.

FIG. 1A—Computer System

FIG. 1A illustrates a computer system 82 configured to execute program instructions according to some embodiments of the invention. One embodiment of a method for vectorizing combinations of program operations is described below.

As shown in FIG. 1A, the computer system 82 may include a display device configured to display a program, such as a graphical program, as the program is created and/or executed, or results of execution of the program. The display device may also be configured to display a graphical user interface of the program, e.g., a front panel of the graphical program) during execution of the program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs, e.g., graphical programs, which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
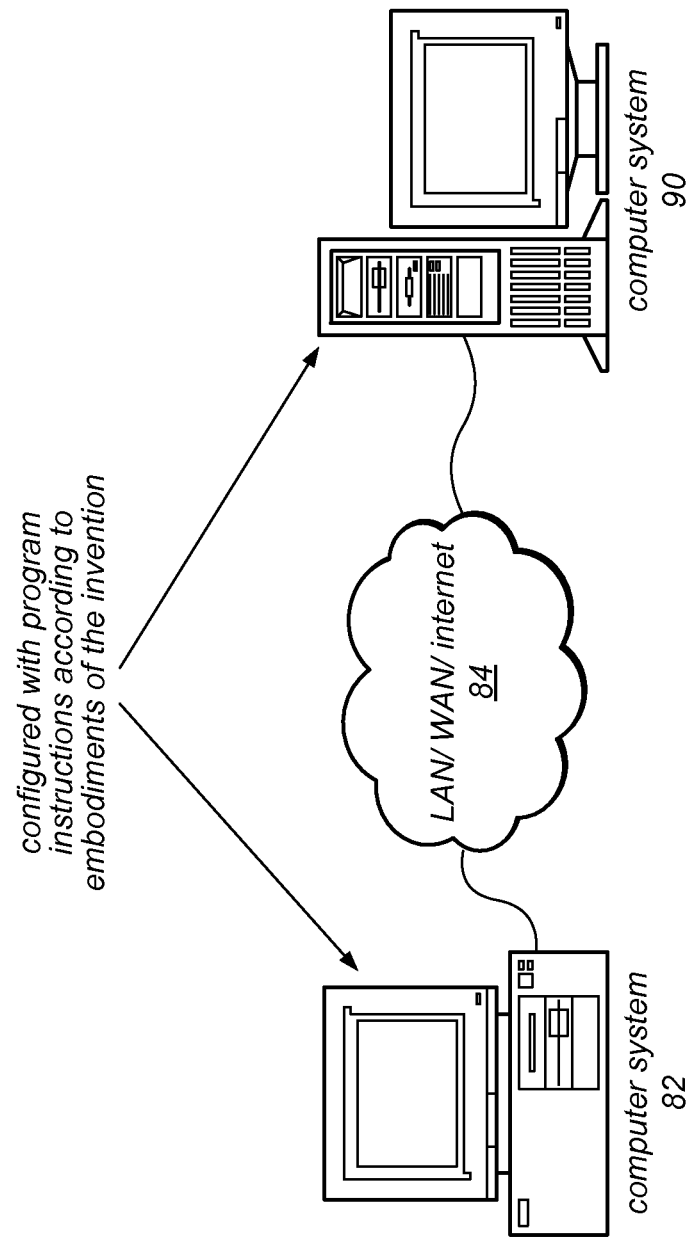
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program, e.g., a graphical program, in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

For example, in some embodiments, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. In other embodiments, the program may be a text-based program.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
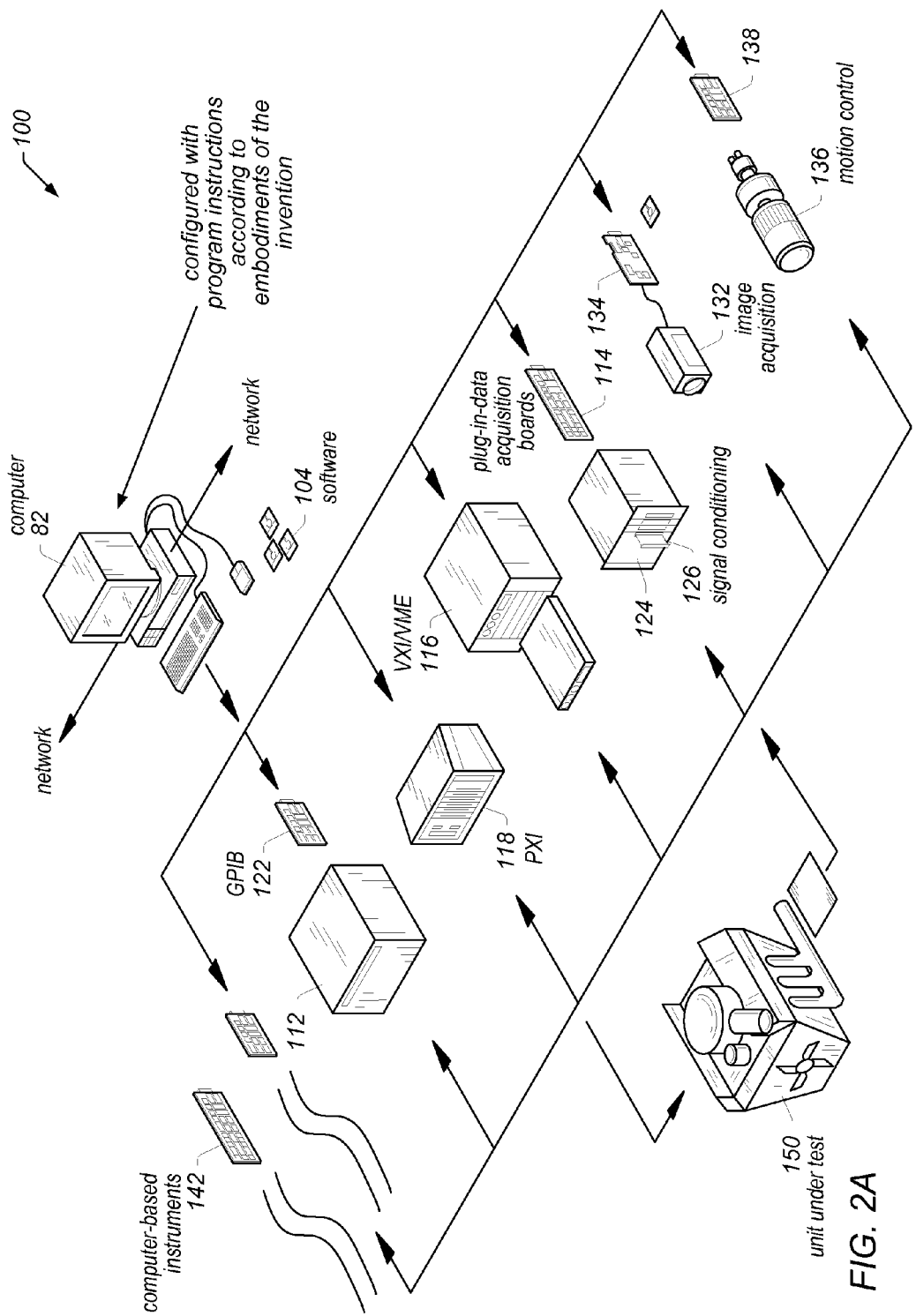
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
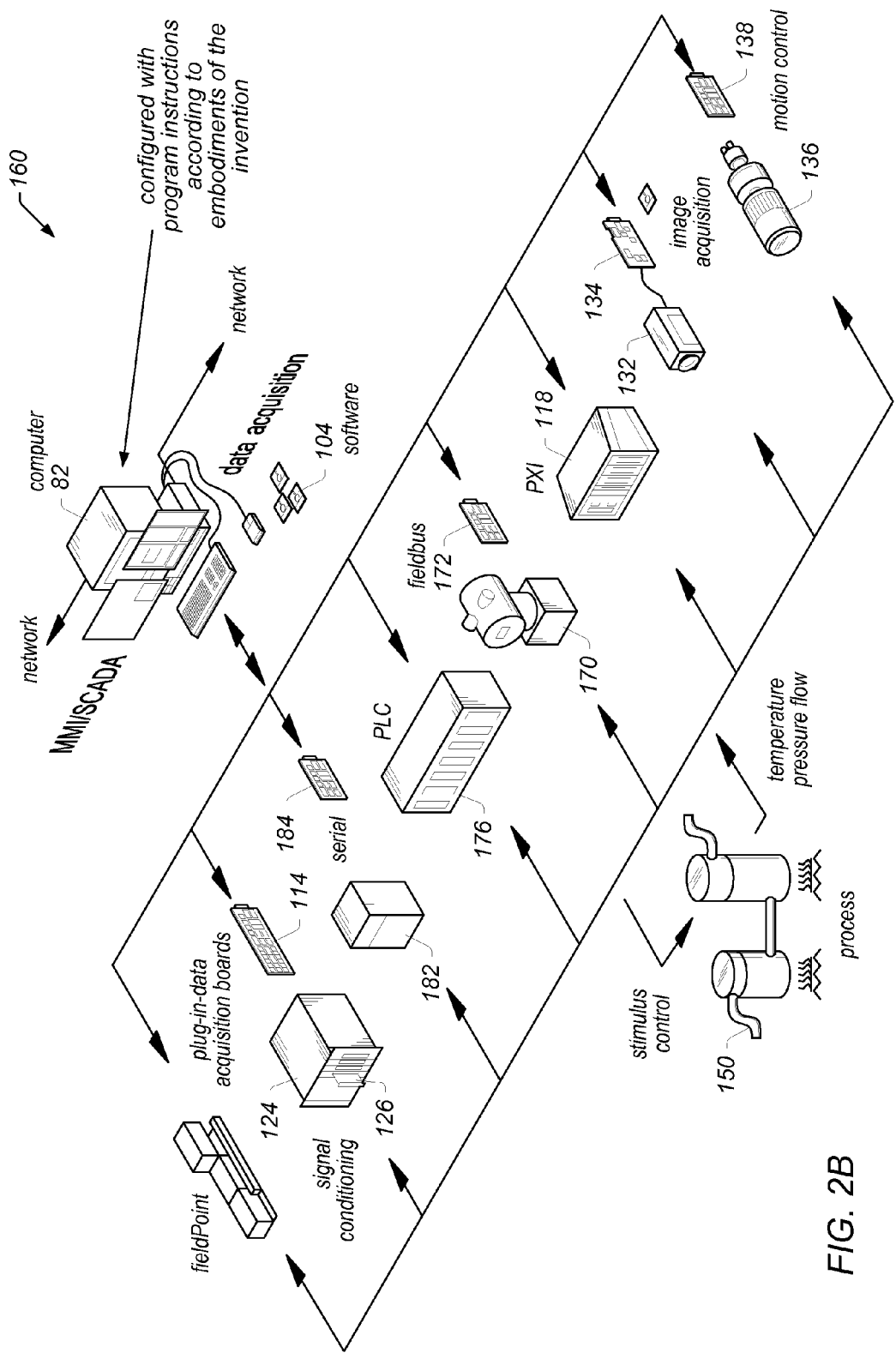
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
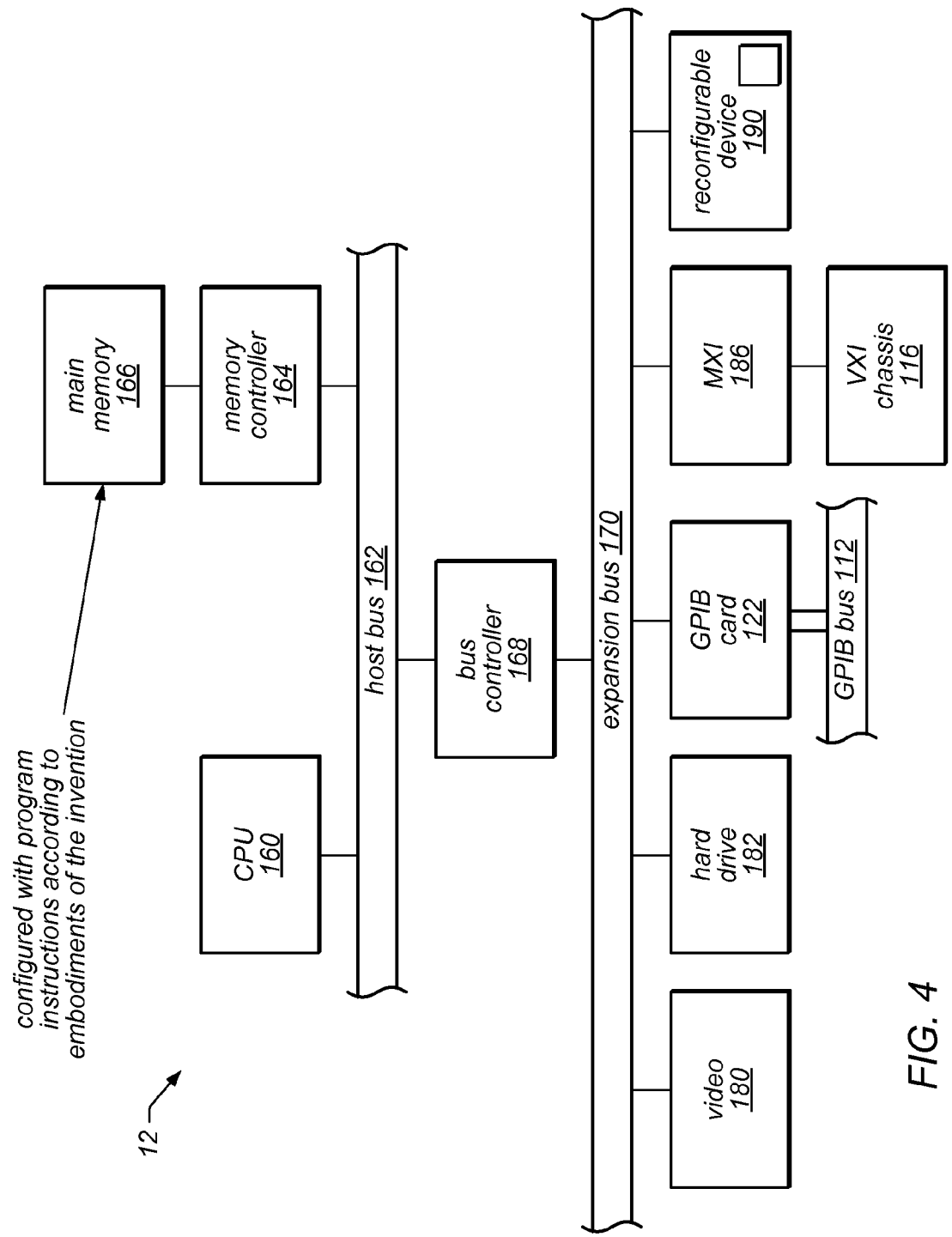
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the program (e.g., graphical program) configured to vectorize combinations of program operations. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
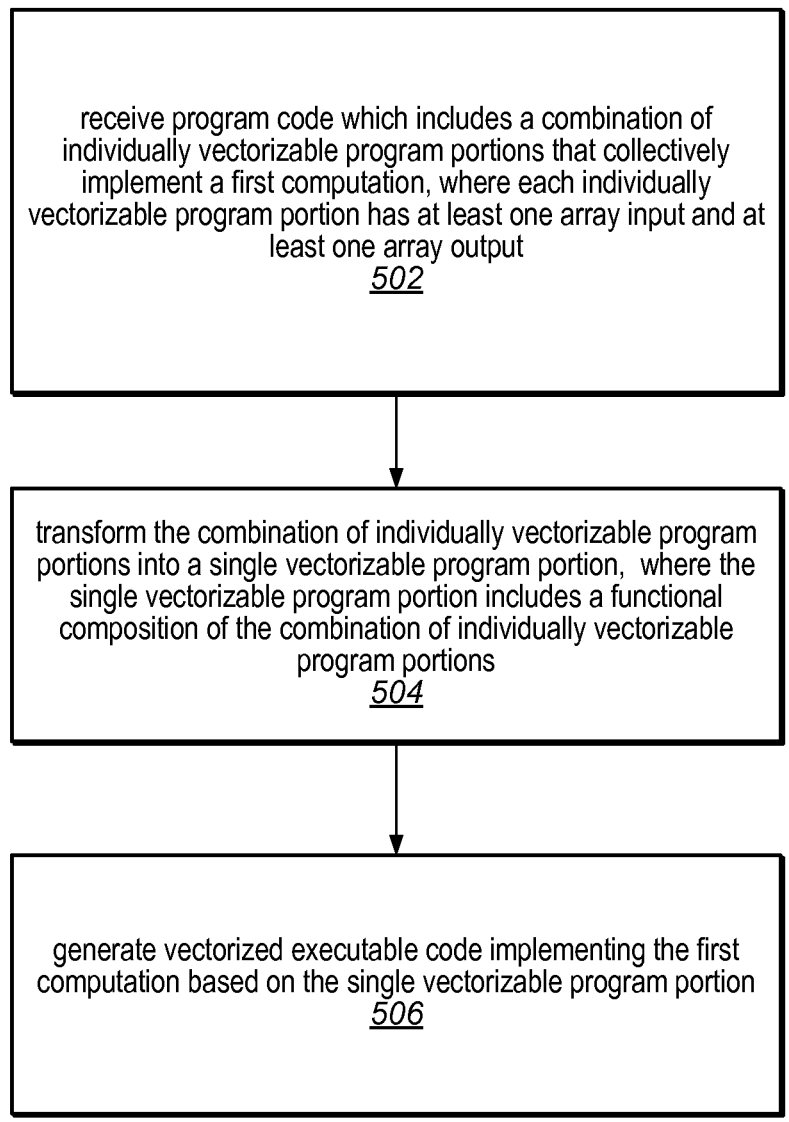
FIG. 5 is a flowchart diagram illustrating one embodiment of a method for vectorizing combinations of program operations.

FIG. 5—Flowchart of a Method for Vectorizing Combinations of Program Operations FIG. 5 illustrates a method for vectorizing combinations of program operations. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, program code comprising a combination of individually vectorizable program portions that collectively implement a first computation may be received. Each individually vectorizable program portion may have at least one array input and at least one array output. In various embodiments, the program portions may include any of a variety of program code operations. For example, in one embodiment, at least two of the program portions may be or include polymorphic primitives. In another exemplary embodiment, at least two of the program portions may be or include vectorizable loops. However, it should be noted that other types of program portions may be used, so long as they are individually vectorizable.

Moreover, the program code may be in any of a variety of computer programming languages. For example, the program code may be textual, or graphical. Similarly, the program code may be procedural in nature, or may be or include data flow program code. Thus, in one embodiment, the program code may be graphical data flow program code, such as that used in the LabVIEW graphical programming system provided by National Instruments Corporation. Additionally, the program code may implement (or perform) any of a variety of functionalities, including, for example, an industrial automation function, a process control function, or a test and measurement function, among others.

In 504, the combination of individually vectorizable program portions may be transformed into a single vectorizable program portion. The single vectorizable program portion may be or include a functional composition of the combination of individually vectorizable program portions. In other words, the resulting single vectorizable program portion may be a composite function composed of the combination of individually vectorizable program portions.

In some embodiments, transforming the combination of individually vectorizable program portions into a single vectorizable program portion may include analyzing data dependences between operations of the individually vectorizable program portions, generating one or more expressions representing each individually vectorizable program portion, based on the analysis, merging the one or more expressions from each individually vectorizable program portion into a single set of expressions representing the first computation, and creating the single vectorizable program portion implementing the first computation in response to the merging, where the single vectorizable program portion includes the single set of expressions.

In one embodiment, the program code may be or include graphical program code in a graphical program, where the graphical program includes a plurality of interconnected nodes that visually indicate functionality of the graphical program code.

Figure 6:
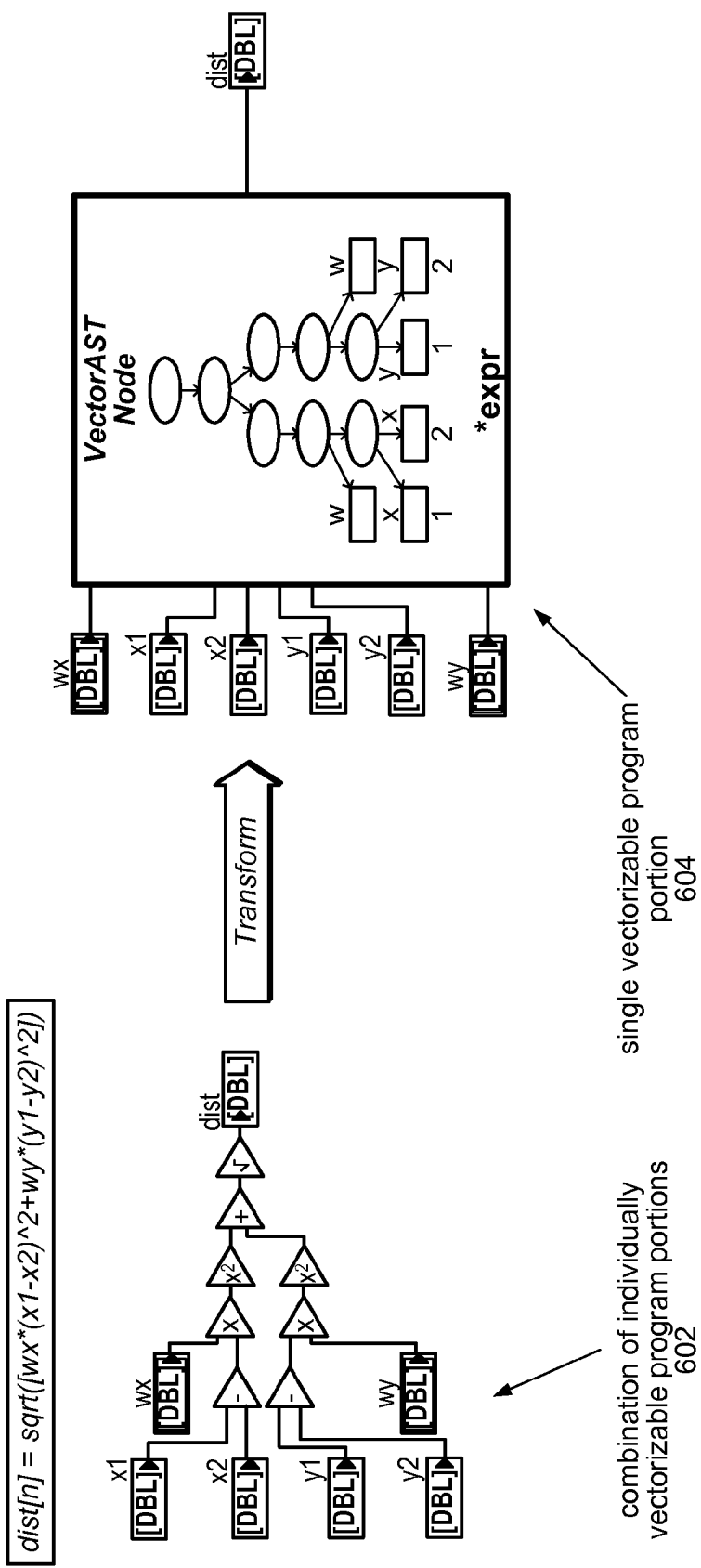
FIG. 6 illustrates a computation for calculating weighted distances between respective pairs of points from two point sets, and a vector computation node that vectorizes the computation, according to one embodiment.

FIG. 6 is a high level illustration of an exemplary transformation of a combination of individually vectorizable program portions 602 to a single vectorizable program portion 604. More specifically, in this example, the combination of individually vectorizable program portions 602 implements a weighted distance calculation that takes four coordinate arrays ($x_1[\ ], y_1[\ ], x_2[\ ], y_2[\ ]$) as input. These four coordinate arrays store two sets of 2D points, where arrays $x_1[\ ]$ and $y_1[\ ]$ together provide multiple coordinate pairs $(x_1, y_1)_i$, i.e., an $x_1 y_1$ point set, with i denoting the array index, and arrays $x_2[\ ]$ and $y_2[\ ]$ together provide multiple coordinate pairs $(x_2, y_2)_i$, i.e., an $x_2 y_2$ point set. The calculation applies respective weights wx and wy in the distance computation, and outputs the weighted distance between each corresponding pair of points from the two point sets $x_1 y_1$ and $x_2 y_2$ together as an output array distil. Note that FIG. 6 displays a graphical program code implementation of the combination, and further shows a textual code version of the computation (above the graphical version):

$$\text{dist}[n] = \sqrt{(w_x \cdot (x_1[i] - x_2[i])^2 + (w_y \cdot (y_1[i] - y_2[i])^2}; i\epsilon[1,n] \quad (1)$$

Note that the graphical code version of the combination includes graphical operations (see triangle shaped graphical program nodes with indications of their functionality) that correspond to each of the textual operations of equation (1), specifically, subtraction, multiplication, square, addition, and square root. Note also that the input arrays are all arrays of type double, as indicated by "[DBL]".

As FIG. 6 shows, the program code (be it graphical or textual) may be transformed into the single vectorizable program portion 604, which in this exemplary embodiment is in the form of a node. In some embodiments the node may be a node in an intermediate representation, e.g., data flow intermediate representation (DFIR). Note that in various embodiments, such a node may or may not be visible to a user, but generally is not. In other embodiments, the single vectorizable program portion 604 may not be in the form of a node, but may take other forms, e.g., a textual representation, a data structure, etc., as desired.

Figure 7:
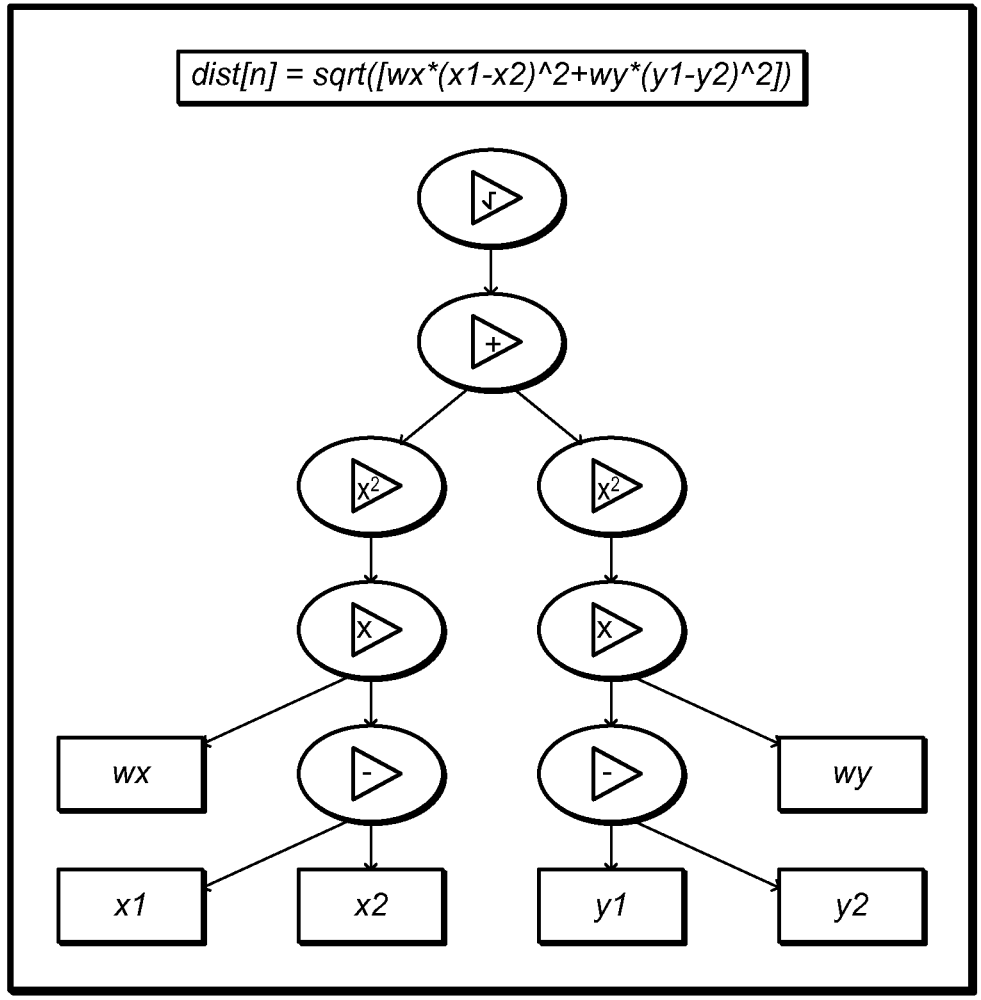
FIG. 7 illustrates a more detailed version of the expression shown in the vector computation node of FIG. 6, according to one embodiment.

The exemplary node of FIG. 6 displays an expression that represents the transformed functionality of the node. A more detailed version of the expression is shown in FIG. 7, which clearly shows the identity and disposition or relationship of each operation in the collective function (composition).

The data dependency analysis may be performed in any of a variety of ways. For example, in one embodiment, analyzing data dependences between operations of the individually vectorizable program portions may include traversing a data flow graph corresponding to the program code in reverse data flow order, including traversing elements in the data flow graph that correspond to the combination of program portions. Moreover, in some embodiments, the method may further include generating the data flow graph based on the program code.

The single set of expressions representing the first computation may include one or more recursive expressions, e.g., in an intermediate form. For example, in one embodiment, the data flow graph may be in the form of a data flow intermediate representation (DFIR), and the one or more recursive expressions may also be in this form. Of course, in other embodiments, other intermediate forms may be used as desired. In various embodiments, the one or more recursive expressions may be implemented in different ways. For example, the one or more recursive expressions may be or include one or more expression trees, or one or more directed acyclic graph (DAG) representations for or of the one or more recursive expressions. In alternative embodiments, other types of graphs may be used, as appropriate, e.g., cyclic graphs, etc. Note that the expression of FIG. 7 is an expression tree, and is recursive.

In some embodiments, the combination of program portions may include two or more output arrays. Traversing the data flow graph in reverse data flow order may include traversing the data flow graph in reverse data flow order from each of the two or more output arrays respectively. In other words, since there are two or more output structures (the two or more output arrays), and the data flow graph is traversed in reverse data flow order, each output structure is a starting point for a respective traversal.

In 506, vectorized executable code implementing the first computation may be generated based on the single vectorizable program portion. For example, generating the vectorized executable code may include generating executable code directed to SIMD (Single-Instruction-Multiple-Data) computing units of a target processor. However, it should be noted that in other embodiments, the generated executable code may be directed to other types of computing units that facilitate vectorized computations.

In some embodiments, the single vectorizable program portion may be merged with other single vectorizable program portions, e.g., prior to the code generation. For example, the program code of 502 may be a first part of a program, and the program may further include one or more additional parts, where each additional part includes a respective combination of program portions. Moreover, as with the program code of 502, each program portion in each respective combination of program portions may have at least one array input and at least one array output.

The method may include performing the receiving and transforming described above in 504 and 506 for each of the respective combinations of program portions, thereby generating one or more respective additional single vectorizable program portions. The single vectorizable program portion may then be merged with at least one of the one or more additional single vectorizable program portions.

Note however that in some embodiments, the merging may be contingent upon certain conditions. For example, in one embodiment, the single vectorizable program portion may be merged with at the least one of the one or more additional single vectorizable program portions in response to determining that the at least one array input of the single vectorizable program portion and the at least one array input of the at least one additional single vectorizable program portion have equal numbers of elements, and that there is no dependency between the single vectorizable program portion and the at least one array input of the at least one of the one or more additional single vectorizable program portions, and any heterogeneous input structures of the vectorization node and the at least one of the one or more additional single vectorizable program portions have the same type. As used herein, the term "heterogeneous input structures" refer to structures that include elements of more than one data type, e.g., "mixed type" structures, nested structures, e.g., arrays of arrays, structures of arrays, arrays of structures, structures of structures, and so forth.

Note, however, that in other embodiments, other merge criteria or constraints may be used as desired. For example, in one embodiment, fulfilling one or more of the criteria mentioned above may be required. Note further that in some embodiments, one or more of the criteria may be determined at edit time, and/or one or more of the criteria may be determined at runtime.

Accordingly, generating the vectorized executable code may include generating the vectorized executable code based on the merged single vectorizable program portion.

Thus, in some embodiments, multiple combinations of individually vectorizable program portions that collectively implement respective computations may be transformed and merged to create a merged single vectorizable program portion, which may then be used to generate vectorized executable code implementing the respective computations. Moreover, as noted above, the generated vectorized executable code may be directed to SIMD computing units of the target processor.

Additionally, in some embodiments, the method may further include graphically indicating any vectorized program portions in the program code. Thus, the user may be able to easily see which portions of the program have been vectorized. The graphical indication(s) may be presented in any of a variety of ways. For example, as noted above, the program may be a graphical program, such as a LabVIEW™ graphical program, which includes a plurality of interconnected nodes that visually indicate functionality of the graphical program code. In some exemplary embodiments, the vectorized program portions in the program code may be graphically indicated by node color, texture, labels, boundaries, e.g., bounding boxes, etc., as desired. In other words, any type of graphical indications may be used as desired or appropriate.

Thus, summarizing an exemplary embodiment of the above method, vectorizable combinations of program portions may be identified in a program, transformed and/or merged into a single vectorizable computation or program portion, which is used to generate vectorized code targeted for execution on the SIMD units of a processor. Additionally, the vectorized computations, combinations, or program code may be indicated in the program graphically.

Exemplary Embodiments

The following describes further exemplary embodiments of the above-described techniques, although it should be noted that the embodiments described are exemplary only, and are not intended to limit the invention to any particular form, function, or appearance.

Vector Computation Node (VCN)

As noted above, in some embodiments, the single vectorizable program portion may be in the form of a node, e.g., a node in an intermediate representation, e.g., data flow intermediate representation (DFIR). In one embodiment, the generated single vectorizable program portion may be a vector computation node (VCN) in a dataflow graph. The VCN is more general than polymorphic primitives. For example, in one embodiment, a VCN may have multiple inputs and multiple outputs, and may perform arbitrarily complex computations, which is not the case with polymorphic primitives. Additionally, the inputs to VCN may be scalar, arrays, or other aggregated structures, including heterogeneous data structures. The outputs of VCN may similarly be arrays or other aggregated structures, e.g., heterogeneous structures.

The VCN may be operable to perform streaming of multi-element computations, e.g., in a loop. For example, in one embodiment, in each iteration of the loop, the VCN (actually, the associated vectorized computations performed by the SIMD unit of a processor) may consume a fixed number of elements from each input array or aggregate, e.g., heterogeneous, structure. If the input is scalar, the VCN may replicate the scalar to populate a vector structure and use the vector structure for the vectorized computation. Analogously, in each iteration, the VCN may produce a fixed number of elements for each output terminal of the VCN. The actual computation for each output may be represented as a recursive expression inside the VCN (shown inside the VCN in FIG. 6).

In other words, the size of an input vector to the SIMD unit is primarily determined by the hardware (SIMD unit). For example, if the processor (SIMD unit) supports processing of 128 bit data at a time, and each element in the input array (of the VCN) is 32 bits in size, then the input vector to the SIMD unit will be 4. Thus, in a case where an input array X is to be added to an input array Y, portions of each input array may be presented (packed) as respective input vectors for the SIMD unit with 4 elements each.

Figure 8:
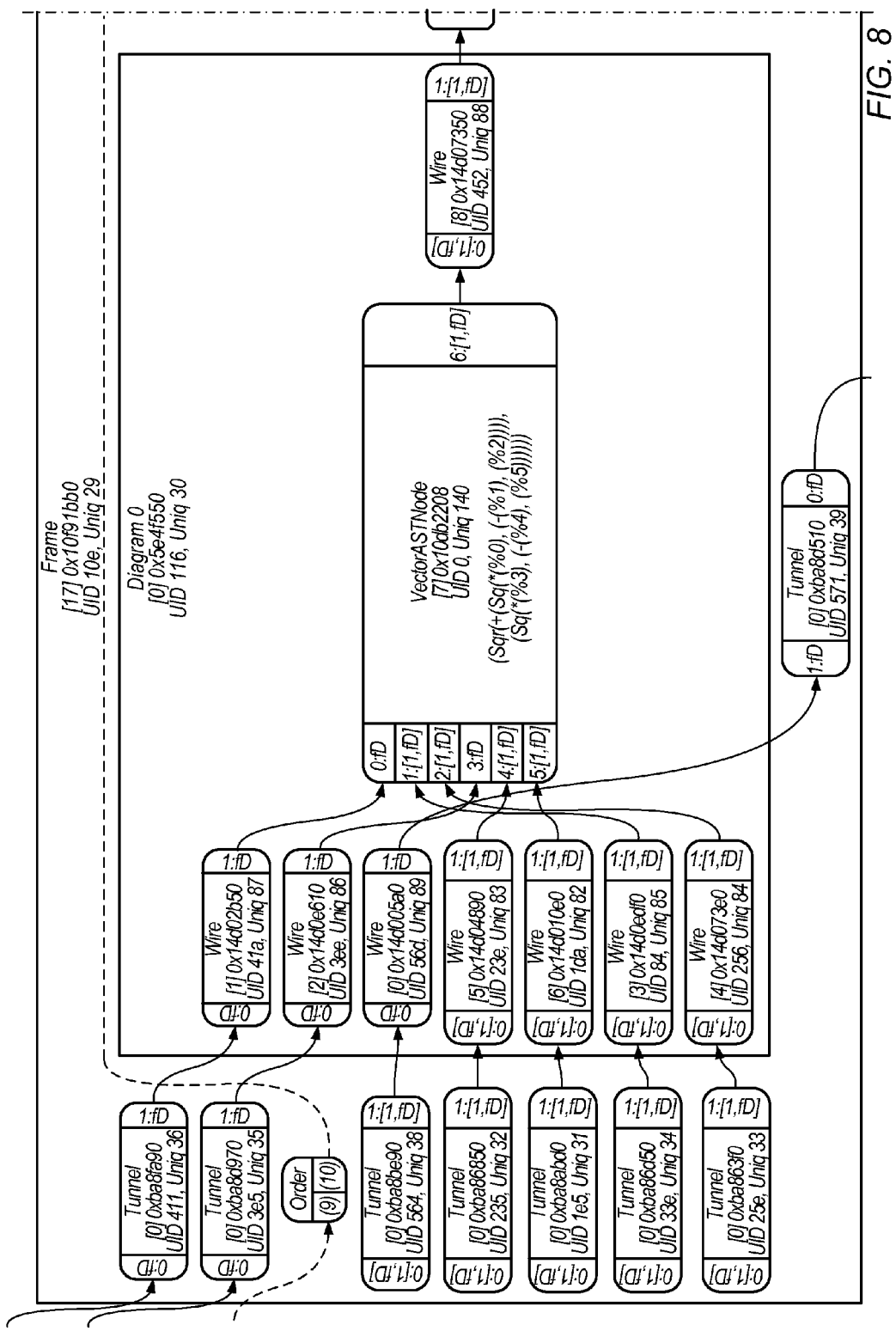
FIG. 8 illustrates an exemplary vector computation node in a data flow intermediate representation, according to one embodiment.

FIG. 8 illustrates a portion of an internal or intermediate representation of an exemplary VCN, labeled "VectorAST-Node" (Vector Abstract-Syntax-Tree Node) and associated elements (also intermediate representations) for passing data to and from the VCN. The computation expression included in the node is shown as a string (textual equation) at the bottom of the VectorASTNode (and denoted in the node of FIG. 6 by "*expr".

An abstract-syntax-tree (AST) representation is a tree-like representation for arithmetic expressions, and is widely used in text based compilers. The AST may be complex and in some cases may become a DAG (directed acyclic graph), such as in the example diagram of FIG. 9B, described below. In some embodiments, the VCN may be polymorphic, and so may be referred to as a polymorphic vectorization node (PVN). For example, the PVN may be a polymorphic node with arbitrary numbers of inputs and outputs, and may perform (or generate) vectorized computations for every expression inside it.

Note that typically, the VCN, and the intermediate representation in general, are not visible to the user/developer. Thus, the partial diagram of FIG. 8 is meant to be illustrative only. More specifically, in the example of FIG. 8, the vector computation node is only used in or by the compiler internally, and is generated automatically in an intermediate form, e.g., a DFIR. The diagram portion shown is an exemplary DFIR graph (portion) resulting from applying the transformation disclosed herein on the weighted distance program code shown in FIG. 6, and described above.

The user may not be able to create such a node in a LabVIEW graphical program. However, in some embodiments, a visual or graphical version of the representation may be generated and made available for viewing by the user. For example, in one embodiment, the user may be able to create a VCN (or functional equivalent) directly in a program development environment, e.g., LabVIEW.

Figure 10:
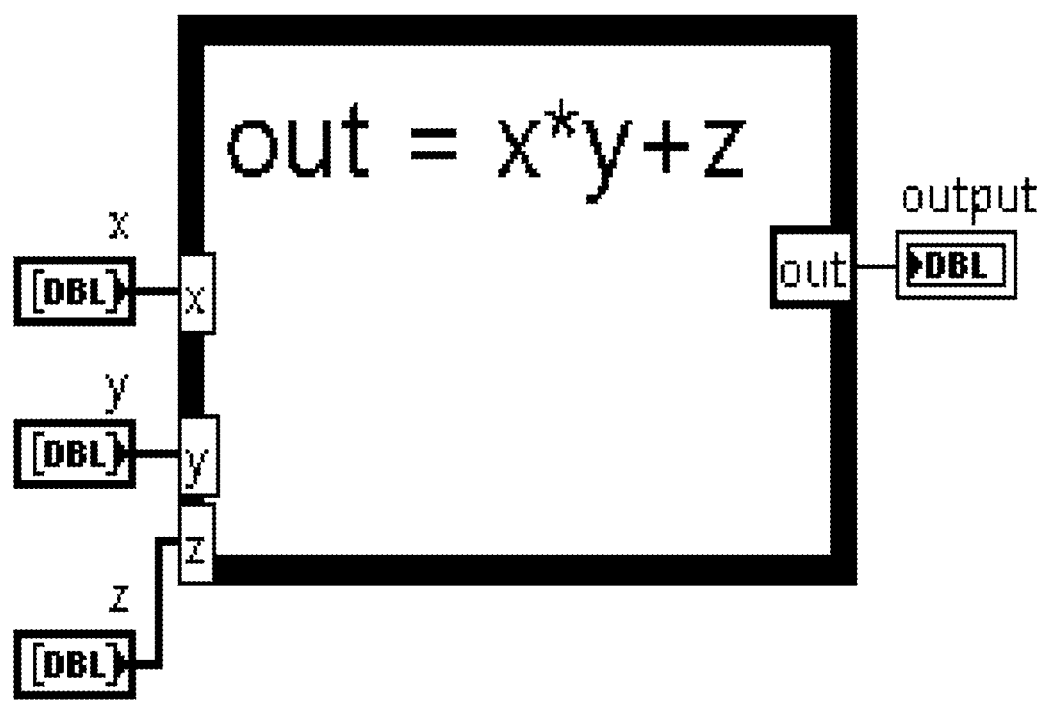
FIG. 10 illustrates an exemplary user-created vector computation node, according to one embodiment.

FIG. 10 illustrates a simple exemplary node that could be created by a user. In this particular example, the node resembles another LabVIEW node, specifically, a FormularBox node that allows the user to specify a computation by including a formula in the node interior (box). The VCN box may include an arbitrary number of inputs and outputs, and the user may be able to specify any number of computation expressions as desired. Thus, the user may explicitly specify computations to be vectorized in the program. Accordingly, vectorized code may be generated for the specified computation(s). However, in this particular embodiment, inputs to the node must be scalars or aggregated structures such as arrays or structures.

Vectorization Transform

In one embodiment, a transform may be provided that automatically traverses a dataflow graph corresponding to the program (or program code), and searches for opportunities to create vector computation nodes to replace combinations of vectorizable program portions. The transform may be fully automatic and may create new vector computation nodes in the dataflow graph to replace the combinations. The transform may traverse the dataflow diagram in reverse order, walking its way up (or back along) the dataflow graph, absorbing or incorporating operations, e.g., polymorphic primitives, and constructing a recursive expression internally. This process may stop when a non-vectorizable operation is encountered, or according to specified heuristics, such as limits on the size of the internal expression, limits on forking number of an output terminal, etc.

Vectorized Backend Code Generator

As noted above, vectorized executable code may be generated based on the single vectorized program portion, e.g., the VCN, which, as also mentioned above, may perform or facilitate streaming of multi-element computations. In some embodiments, this code generation may be performed by a vectorized backend code generator for the vector computation node (or, more generally, the single vectorized program portion), e.g., as part of the compiler. The code generator may take advantage of the streaming semantics of the VCN and may map the vectorized computation onto the SIMD units on the hardware. If necessary, the code generator may also handle alignment and perform necessary pre-peeling and post-peeling internally to maximize the performance gain of VCN.

Advantages that may obtain from the techniques discussed above may include the following:

Loop fusion and vectorization may be performed in one step. In other words, in some embodiments, loops may be detected in the program (or graph), and where appropriate, may be merged or fused. Thus, for example, if two fusable loops contain respective vectorizable code portions, the method may perform loop fusion and vectorize a combination of the two vectorizable code portions.

All fundamental numerical types may be vectorized, such as signed/unsigned int, single/double precision float, and complex values, among others.

Different types of collection containers may be vectorized, such as, for example, arrays and structures, e.g., heterogeneous structures. Vectorization for arrays may be straightforward since all the elements in the array are of the same type. In the case of structures, the VCN (or single vectorized program portion) may vectorize the computations for individual fields inside the structure when they are of the same type.

Both compact containers (i.e. contiguous arrays) and non-compact containers (i.e., arrays with a stride) may be vectorized. Vectorization of a compact array may be performed in a straightforward manner by using a wider load/store instruction in the hardware. The vectorization for a non-compact array may be a little more complex depending on hardware support. For example, if the hardware supports gather/scatter type load/store operations, these instructions may be used to directly pack vectorized elements for computation. Alternatively, if the hardware does not support scatter/gather load/store operations, software may be utilized to pack vectorized elements, i.e., to load individual elements and move them to a packed vector for computation.

In some embodiments, the method may facilitate static (e.g., edit time) target specific vector code generation, as well as dynamic target code selection at run time. Thus, for example, if the running targets are known beforehand, e.g., at edit time, the code generator may generate the target specific vectorized instruction. Alternatively, if the specific target is not known beforehand, the code generator may generate several versions of vectorized code for different hardware architectures, possibly along with a test for target determination or identification. At runtime, the test may be performed to determine which targets are running, and may jump to the corresponding code (version) for execution accordingly.

Visual or graphical feedback may be provided in the program. For example, in one embodiment, feedback may be provided on the user diagram (graphical program) in a graphical dataflow programming language. Vectorized program code, e.g., polymorphic primitives, loops, combinations, etc., may be indicated visually in the graphical dataflow programming language, e.g., by casting a shadow behind the program elements, by changing the color of the elements, or via any other visual means of demarcation or highlighting. This visualization may be performed automatically at edit time, or at the user's request, i.e., in response to user input.

The debuggablity of programs in a graphical programming language may be degraded gracefully. For example, the user may be prevented from probing intermediate results for vectorized code. In one exemplary embodiment, breakpoints set on the original program elements (of the combinations) may be propagated to the new VCN node. Then, when the program runs, it may break (pause execution) before the VCN node and highlight the combination of program elements/operations transformed into the VCN. When the user single steps through the breakpoint, the program may execute the VCN and highlight the set of original program elements as just executed.

The techniques disclosed herein may provide a way for a programmer to fully utilize the SIMD units on CPUs to perform multiple data computation in a much larger scope than individual operations. Additionally, benefits may also accrue regarding pipelining computations, e.g., though the support of pipeline computations in the hardware (i.e., CPU) without any software effort; or though explicit pipelining in the code generator via software if the target hardware does not support pipelining.

Figure 9A:
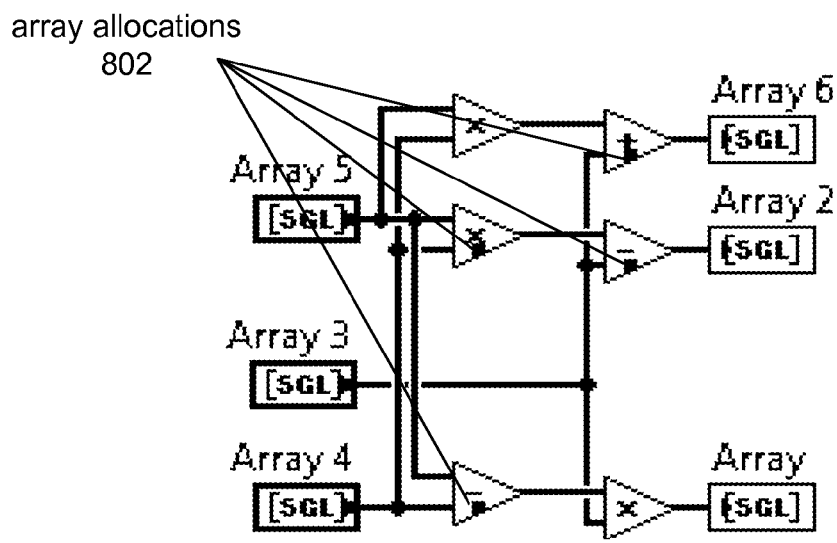
FIGS. 9A and 9B illustrate a benefit of the vector computation node regarding computation-related memory allocation, according to one exemplary embodiment.
Figure 9B:
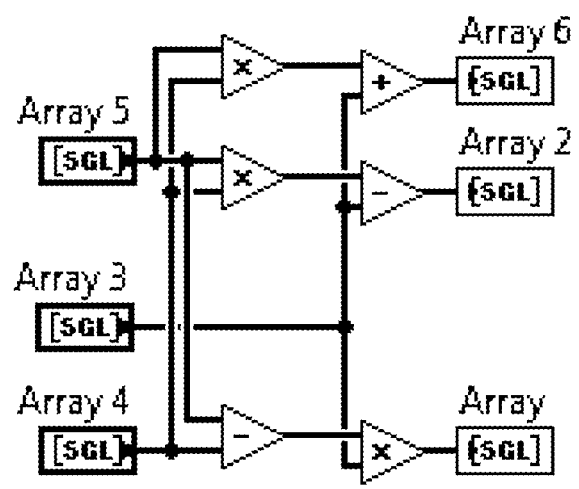

In some embodiments, intermediate results of the above process may be stored in vector registers, thus avoiding the use of temporary array storage and memory accessing (i.e. store/load) for intermediate results, and improving performance. Additionally, in-placeness performance may be improved, which may lead to smaller memory footprint and fewer memory accesses. This benefit is illustrated in FIGS. 9A and 9B. FIG. 9A illustrates an exemplary (LabVIEW) graphical code portion that indicates buffer allocations required when no VCN transformation is applied. More specifically, (four) array allocations associated with various of the operations are denoted by black (square) dots in the diagram. Thus, without the VCN transform LabVIEW makes four extra allocations of arrays to store intermediate values. In contrast, FIG. 9B shows the same program code when the VCN transform is used, where, as may be seen, LabVIEW completely avoids having to use temporary arrays, i.e., use of the transform results in no extra array allocations. Thus, the present techniques may obviate or minimize temporary array allocations.

In some embodiments, the present techniques may minimize iterations needed to perform the specified computation. For example, if the input arrays are of different sizes, the method may only iterate based on the smallest dimension of the arrays, thus only performing the minimum number of iterations.

Creating a Graphical Program

The below describes exemplary methods for creating a graphical program. First, a graphical program may be created or assembled on the computer system 82 (or on a different computer system) by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions for vectorizing combinations of program operations, wherein the program instructions are executable to perform:
    receiving program code comprising a combination of individually vectorizable program portions that collectively implement a first computation, wherein each individually vectorizable program portion has at least one array input and at least one array output, wherein the program code comprises graphical program code in a graphical program, wherein the graphical program comprises a plurality of interconnected nodes that visually indicate functionality of the graphical program code;
    transforming the combination of individually vectorizable program portions into a single vectorizable program portion, wherein the single vectorizable program portion comprises a functional composition of the combination of individually vectorizable program portions; and
    generating vectorized executable code implementing the first computation based on the single vectorizable program portion, wherein said generating comprises generating executable code directed to SIMD (Single-Instruction-Multiple-Data) computing units of a target processor.

2. The non-transitory computer accessible memory medium of claim 1, wherein said transforming the combination of individually vectorizable program portions into a single vectorizable program portion comprises:
    analyzing data dependences between operations of the individually vectorizable program portions;
    generating one or more expressions representing each individually vectorizable program portion, based on said analyzing;
    merging the one or more expressions from each individually vectorizable program portion into a single set of expressions representing the first computation; and
    creating the single vectorizable program portion implementing the first computation in response to said merging, wherein the single vectorizable program portion comprises the single set of expressions.

3. The non-transitory computer accessible memory medium of claim 2, wherein said analyzing data dependences between operations of the individually vectorizable program portions comprises:
    traversing a data flow graph corresponding to the program code in reverse data flow order, including traversing elements in the data flow graph that correspond to the combination of program portions; and
    wherein the single set of expressions representing the first computation comprises one or more recursive expressions in an intermediate form.

4. The non-transitory computer accessible memory medium of claim 3, wherein the combination of program portions comprises two or more output arrays, wherein said traversing the data flow graph in reverse data flow order comprises performing said traversing the data flow graph in reverse data flow order from each of the two or more output arrays respectively.

5. The non-transitory computer accessible memory medium of claim 3, wherein the one or more recursive expressions comprises:
    one or more expression trees; or
    one or more directed acyclic graph (DAG) representations for the one or more recursive expressions.

6. The non-transitory computer accessible memory medium of claim 3, wherein the program instructions are further executable to perform:
    generating the data flow graph based on the program code.

7. The non-transitory computer accessible memory medium of claim 1, wherein the program code is a first part of a program, wherein the program further comprises one or more additional parts, each additional part comprising a respective combination of program portions, and wherein each program portion in each respective combination of program portions has at least one array input and at least one array output, wherein the program instructions are further executable to perform:
    performing said receiving and said transforming for each of the respective combinations of program portions, thereby generating one or more respective additional single vectorizable program portions;
    merging the single vectorizable program portion with at least one of the one or more additional single vectorizable program portions in response to determining that:
        the at least one array input of the single vectorizable program portion and the at least one array input of the at least one additional single vectorizable program portion have equal numbers of elements, and there is no dependency between the single vectorizable program portion and the at least one array input of the at least one of the one or more additional single vectorizable program portions; and
        any heterogeneous input structures of the vectorization node and the at least one of the one or more additional single vectorizable program portions have the same type.

8. The non-transitory computer accessible memory medium of claim 1, wherein at least two of the program portions comprise:
    polymorphic primitives; or
    vectorizable loops.

9. The non-transitory computer accessible memory medium of claim 1, wherein the program code comprises data flow program code.

10. The non-transitory computer accessible memory medium of claim 1, wherein the program instructions are further executable to perform:
    graphically indicating any vectorized program portions in the program code.

11. The non-transitory computer accessible memory medium of claim 1, wherein the program code is configured to perform one or more of:
    an industrial automation function;
    a process control function;
    a test and measurement function.

12. A computer-implemented method for vectorizing combinations of program operations, the method comprising:
    utilizing a computer to perform:
        receiving program code comprising a combination of individually vectorizable program portions that collectively implement a first computation, wherein each individually vectorizable program portion has at least one array input and at least one array output, wherein the program code comprises graphical program code in a graphical program, wherein the graphical program comprises a plurality of interconnected nodes that visually indicate functionality of the graphical program code;
        transforming the combination of individually vectorizable program portions into a single vectorizable program portion, wherein the single vectorizable program portion comprises a functional composition of the combination of individually vectorizable program portions; and generating vectorized executable code implementing the first computation based on the single vectorizable program portion, wherein said generating comprises generating executable code directed to SIMD (Single-Instruction-Multiple-Data) computing units of a target processor.

13. The computer-implemented method of claim 12, wherein said transforming the combination of individually vectorizable program portions into a single vectorizable program portion comprises:

analyzing data dependences between operations of the individually vectorizable program portions;

generating one or more expressions representing each individually vectorizable program portion, based on said analyzing;

merging the one or more expressions from each individually vectorizable program portion into a single set of expressions representing the first computation; and creating the single vectorizable program portion implementing the first computation in response to said merging, wherein the single vectorizable program portion comprises the single set of expressions.

14. The computer-implemented method of claim 13, wherein said analyzing data dependences between operations of the individually vectorizable program portions comprises:

traversing a data flow graph corresponding to the program code in reverse data flow order, including traversing elements in the data flow graph that correspond to the combination of program portions; and wherein the single set of expressions representing the first computation comprises one or more recursive expressions in an intermediate form.

15. The computer-implemented method of claim 14, wherein the combination of program portions comprises two or more output arrays, wherein said traversing the data flow graph in reverse data flow order comprises performing said traversing the data flow graph in reverse data flow order from each of the two or more output arrays respectively.

16. The computer-implemented method of claim 14, wherein the one or more recursive expressions comprises:

one or more expression trees; or one or more directed acyclic graph (DAG) representations for the one or more recursive expressions.

17. The computer-implemented method of claim 14, further comprising:

generating the data flow graph based on the program code.

18. The computer-implemented method of claim 12, wherein the program code is a first part of a program, wherein the program further comprises one or more additional parts, each additional part comprising a respective combination of program portions, and wherein each program portion in each respective combination of program portions has at least one array input and at least one array output, the method further comprising:

utilizing the computer to perform:

performing said receiving and said transforming for each of the respective combinations of program portions, thereby generating one or more respective additional single vectorizable program portions;

merging the single vectorizable program portion with at least one of the one or more additional single vectorizable program portions in response to determining that:

the at least one array input of the single vectorizable program portion and the at least one array input of the at least one additional single vectorizable program portion have equal numbers of elements, and there is no dependency between the single vectorizable program portion and the at least one array input of the at least one of the one or more additional single vectorizable program portions; and any heterogeneous input structures of the vectorization node and the at least one of the one or more additional single vectorizable program portions have the same type.

19. The computer-implemented method of claim 12, wherein at least two of the program portions comprise:

polymorphic primitives; or vectorizable loops.

20. The computer-implemented method of claim 12, wherein the program code comprises data flow program code.

21. The computer-implemented method of claim 12, further comprising:

utilizing the computer to perform:

graphically indicating any vectorized program portions in the program code.

22. The computer-implemented method of claim 12, wherein the program code is configured to perform one or more of:

an industrial automation function;

a process control function;

a test and measurement function.

23. A system for vectorizing combinations of program operations, comprising:

a processor; and a memory medium coupled to the processor; and a display device;

wherein the memory medium stores program instructions executable by the processor to:

receive program code comprising a combination of individually vectorizable program portions that collectively implement a first computation, wherein each individually vectorizable program portion has at least one array input and at least one array output, wherein the program code comprises graphical program code in a graphical program, wherein the graphical program comprises a plurality of interconnected nodes that visually indicate functionality of the graphical program code;

transform the combination of individually vectorizable program portions into a single vectorizable program portion, wherein the single vectorizable program portion comprises a functional composition of the combination of individually vectorizable program portions; and generate vectorized executable code implementing the first computation based on the single vectorizable program portion, wherein said generating comprises generating executable code directed to SIMD (Single-Instruction-Multiple-Data) computing units of a target processor.

* * * * *